March 2, 1965 F. D. JOESTING 3,171,421

FLUID AMPLIFIER CONTROL SYSTEM

Filed Dec. 7, 1961 2 Sheets-Sheet 1

INVENTOR.
FREDERICK D. JOESTING

BY Alfred N. Feldman

ATTORNEY

March 2, 1965 F. D. JOESTING 3,171,421
FLUID AMPLIFIER CONTROL SYSTEM
Filed Dec. 7, 1961 2 Sheets-Sheet 2

INVENTOR.
FREDERICK D. JOESTING
BY Alfred N. Feldman
ATTORNEY

United States Patent Office 3,171,421
Patented Mar. 2, 1965

3,171,421

FLUID AMPLIFIER CONTROL SYSTEM

Frederick D. Joesting, Park Ridge, Ill., assignor to Honeywell Inc., a corporation of Delaware Filed Dec. 7, 1961, Ser. No. 157,760
2 Claims. (Cl. 137—81.5)

The present invention is directed to a fluid amplifier diverting system, and more particularly is directed to a two-stage amplifier of exceedingly compact construction that is capable of being switched between two positions by merely opening or closing a pilot valve of a thermostatic type.

Early in 1960, a new type of fluid control device was publicly introduced by personnel at the Diamond Ordnance Fuze Laboratory. The fluid control device was aptly named a fluid amplifier in that fluid control could be obtained by applying a signal which was substantially smaller than the fluid flowing through the over-all unit. The advance in the fluid amplifier art has been rapid and many types of fluid amplifiers and control systems have been publicly disclosed. Patents have recently been issued showing various types of fluid amplifiers and are typified by Patents No. 3,001,539 to Hurvitz and No. 3,001,698 to Warren. The fluid amplifier is basically a fluid control device that has no moving parts in its operation aside from the necessary valving to supply or control fluid to inlet control ports.

The normal configuration of a fluid amplifier requires two inlet control ports diametrically opposed from one another across a main inlet. A pressure differential normally is applied between two inlet ports, and by switching from one inlet port to the other, control of the device is obtained. This type of a fluid amplifier entails two valving functions or two control functions and is not applicable to many situations where a single, active control device is used.

The present invention is directed to a fluid amplifier that utilizes but a single control port for actual control of the device and contains a second control port that is fed back from one of the outlets of the unit. By utilizing this biased arrangement, a small amplification results in a first stage and this amplification can then be applied to a second stage in the same unit to form a power switching function at a level that is commercially feasible.

It is a primary object of the present invention to disclose a fluid amplifier that is capable of developing a signal through control of a single inlet port.

Another object of the present invention is to disclose a compact pilot fluid amplifier that is capable of being switched and which in turn is capable of providing a major switching function of a larger fluid amplifier associated therewith to control a large volume of fluid flow.

Still another object of the present invention is to disclose a cascaded arrangement of fluid amplifiers in a compact configuration wherein each one of the two utilized amplifiers is formed into one-half of the body portion of the device.

And yet another object of the present invention is to disclose a cascaded type of biased fluid amplifier that can be utilized to control the flow of fluid in a heating or cooling system wherein the thermostat for the system is in the initial fluid flow stages of the amplifier.

A further object of the present invention is to disclose a fluid amplifier device that is capable of being manufactured economically so that it is commercially competitive with more conventional types of fluid control devices.

These and other objects will become apparent when the present drawings are considered along with the detailed description, wherein.

Figure 1:
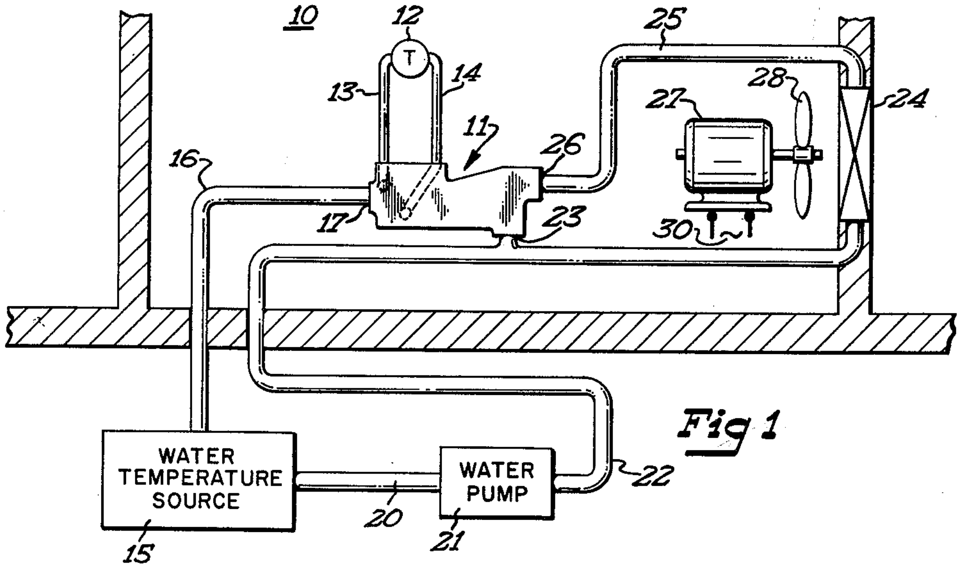
FIGURE 1 is a pictorial representation of a thermostatically controlled fluid amplifier device feeding a temperature controlled area.

In FIGURE 1, 10 represents an area that is to be thermostatically controlled by the present fluid amplifier system. The area contains a fluid amplifier device 11 that is controlled by a pilot control means or thermostat 12 that is connected to the fluid amplifier device 11 by pipes 13 and 14. A water temperature source 15 is connected by pipe 16 to the inlet 17 of the fluid amplifier device 11. The water temperature source 15 can be a boiler that is heated by a burner for supplying hot water in a heating system, or can be a chilled water source for cooling during the summer months. The water temperature source 15 has an inlet pipe 20 that is connected to a water pump 21 that circulates the water in the system continuously. The inlet to the water pump 21 is fed by pipe 22 that connects to an outlet 23 of the fluid amplifier device 11 and also is connected to a radiator 24 which is in turn connected by pipe 25 to a second outlet 26 of the fluid amplifier device 11. An electric motor 27 is supplied with a fan 28 and an appropriately controlled electrical source 30.

The operation of the system of FIGURE 1 will be briefly discussed in order to provide a basis for explanation of the operation of the fluid amplifier device 11. The pump 21 continuously circulates water through the water temperature source 15. The temperature controlled water is supplied to inlet 17 of the fluid amplifier device. Depending upon the condition of the thermostat 12, the water flowing into the inlet 17 is either diverted through the fluid amplifier device 11 to the outlet 26 or to the outlet 23. During the times when the water is diverted to outlet 26, the water flows through pipe 25, radiator 24, and back to the water pump 21 through pipe 22. At this time the fan 28 passes air over the radiator 24 thereby extracting heat from the water during the heating cycle or by chilling the air during an air conditioning cycle. If it is desired to have the radiator 24 inoperative, the fluid amplifier device 11 diverts the fluid input to inlet 17 to the outlet 23 and the water flows from outlet 23 to pipe 22 thereby bypassing the radiator 24. It is thus apparent that the fluid amplifier device 11 provides for control of the system and the system is temperature responsive depending on the condition of the temperature sensing means or thermostatic means 12. The function of the fluid amplifier device 11 will now be explained in some detail.

Figure 2:
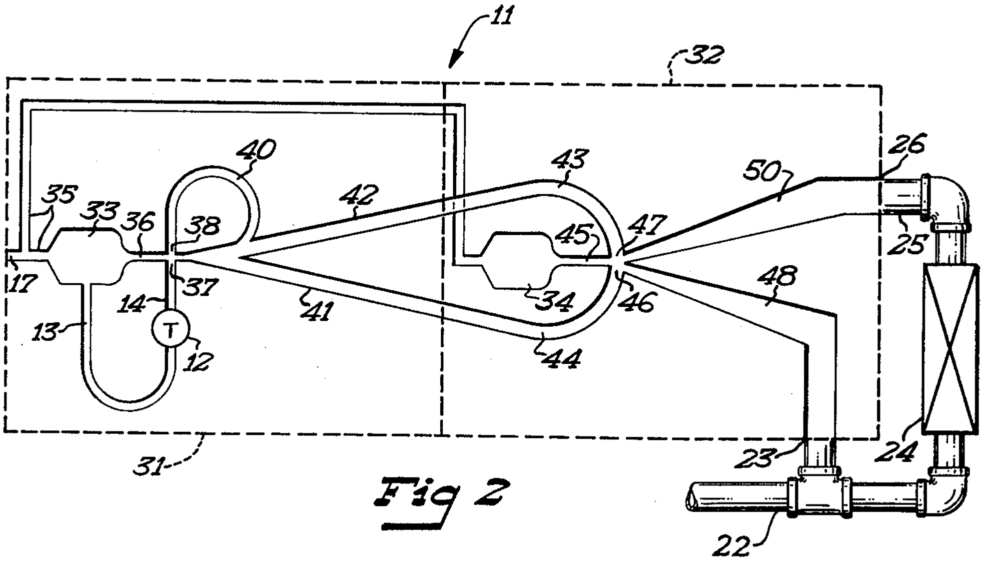
FIGURE 2 is a schematic representation of the novel fluid amplifier so that an explanation of its operation can be readily considered.

In FIGURE 2 the fluid amplifier device 11 is shown in a schematic fashion. The fluid amplifier device 11 is made up of a first fluid amplifier means 31 and a second fluid amplifier means 32. The first fluid amplifier means 31 has a fluid inlet 33 and the second fluid amplifier means 32 has an inlet 34. The inlets 33 and 34 are connected by a common passage 35 which is in turn connected to the inlet 17 of the fluid amplifier device 11. It is thus apparent that the water supplied to the inlet 17 flows freely to the fluid amplifier inlets 33 and 34 thereby supplying both of the fluid amplifier means 31 and 32 with fluid pressure.

The fluid amplifier means 31 has an inlet means 36 that has a pair of opposing control ports 37 and 38 on opposite sides of the inlet means 36. The port 37 is connected by pipe 14 through the thermostat 12 to pipe 13. Pipe 13 is connected back to the inlet 33 of the fluid amplifier means 31 and is thus supplied with fluid as if it were connected directly to the inlet 17 of the fluid amplifier device 11. The inlet fluid flow to the inlet 33 thereby supplies fluid through pipe 13, thermostat 12 and pipe 14 to supply a control jet to the side of the inlet means 36 of the fluid amplifier means 31. This arrangement follows substantially conventional fluid amplifier techniques as are commonly now known in both the literature and patent art.

The second control port 38 is connected to a feedback channel 40 that connects into an outlet channel 42 or outlet means 42 so as to pickup a small percentage of any fluid that might be flowing in the outlet means 42. A second outlet means 41 is provided in the conventional fluid amplifier configuration. The outlet means 41 and 42 are then connected by channels 43 and 44 to the fluid amplifier means 32. The fluid amplifier means 32 has an inlet 34 that is supplied with fluid and which further includes inlet means 45 with control ports 46 and 47 on opposite sides of the inlet means 45. The fluid amplifier 32 further has two outlet means 48 and 50. The outlet means or channel 50 is connected to outlet 26 of the fluid amplifier device 11 while the outlet means or channel 48 is connected to the outlet 23 of the fluid amplifier device 11. Shown in FIGURE 2, connected between the outlets 23 and 26 is conventional plumbing of the pipes 22 including the radiator 24 as was disclosed in FIGURE 1.

The operation of the fluid amplifier system of FIGURE 2 can now be explained. As fluid flows into the inlet 17, it fills the inlet 33 and the inlet 34 along with the pipe 13 to the thermostat or pilot control means 12. With the thermostat 12 closed, there is no fluid issuing from the control port 37 but there will be a small amount of control fluid issuing from control port 38 due to the feedback channel or passage 40. The control fluid fed back to port 38 is sufficient to force the fluid amplifier means 31 to divert all of the fluid flow from the inlet means 36 to the outlet channel 41. With the arrangement thus described, the feedback passage 40 continuously keeps the fluid flow from the inlet means 36 in the outlet channel 41 as long as the thermostat 12 is closed. With the fluid flowing in channel 41, fluid in turn flows into the inlet control channel 44 to the control port 46. The fluid flow to control port 46 diverts all of the fluid flowing in the inlet means 45 of the second fluid amplifier means 32 to the outlet channel 50. The outlet channel 50 is connected to the outlet 26 which causes the fluid to flow through the radiator 24 thereby changing the condition being sensed by the thermostat 12.

Now that it has become necessary to cause fluid to pass around the radiator 24, the thermostat 12 opens allowing fluid to flow through pipes 13 and 14 to supply a control fluid at port 37. The control fluid at port 37 is sufficiently large to overcome the feedback fluid flow from feedback channel 40 and port 38, thereby switching the fluid amplifier device 31 so as to cause all of the flow to pass into the outlet channel 42. The outlet channel 42 of fluid amplifier device 31 flows into channel 43 which in turn is supplied to the control port 47. Upon control port 47 being energized by a fluid flow in channel 43, the fluid amplifier means 32 is switched so that the inlet fluid from the inlet means 45 flows to the outlet channel 48. With all of the fluid flow in the outlet channel 48 the outlet 23 of the fluid amplifier device 11 is supplied with fluid and the fluid in turn flows to pipe 22. This fluid therefore bypasses the heat exchanger or radiator 24 and it becomes apparent that when the thermostat 12 is open there is no flow of conditioned water in the radiator 24.

The operation thus described in connection with FIGURE 2 shows the schematic arrangement for the operation and function of the fluid amplifier device 11. The present invention is directed to the cascaded arrangement of the fluid amplifiers disclosed in FIGURE 2 in a single housing wherein the fluid amplifier means 31 and the fluid amplifier means 32 are each embedded in one half of the body and the two valve bodies are assembled in a fluid tight, unitary amplifier means for the system. More specifically in FIGURE 3, the fluid amplifier means 31 is shown in an isometric exploded view above the fluid amplifier means 32. The fluid amplifier means 31 and the fluid amplifier means 32 are each cast brass members so that they are imprevious to water flow. In the particular version shown, brass has been used but it is obvious that any material which is impervious to the partiular fluid being controlled and which is capable of having the necessary passages either cast or formed thereinto, would be suitable. The fluid amplifier means 31 has an inlet 33 and a thermostat pipe 13. The return thermostat pipe 14 is shown leading to control port 37 which is opposite the control port 38. The feedback channel 40 is also shown along with the outlet channel 42 which is sloped in the upper portion so that it mates with a similarly sloped channel in the lower portion. The other fluid amplifier outlet 41 is also shown as a channel cut into the upper member and it also slopes to mate with the lower member. The numbering of the FIGURE 3 is in correspondence with the numbers utilized in the schematic of FIGURE 2 and it is believed that the correspondence of parts can be readily understood.

Figure 3:
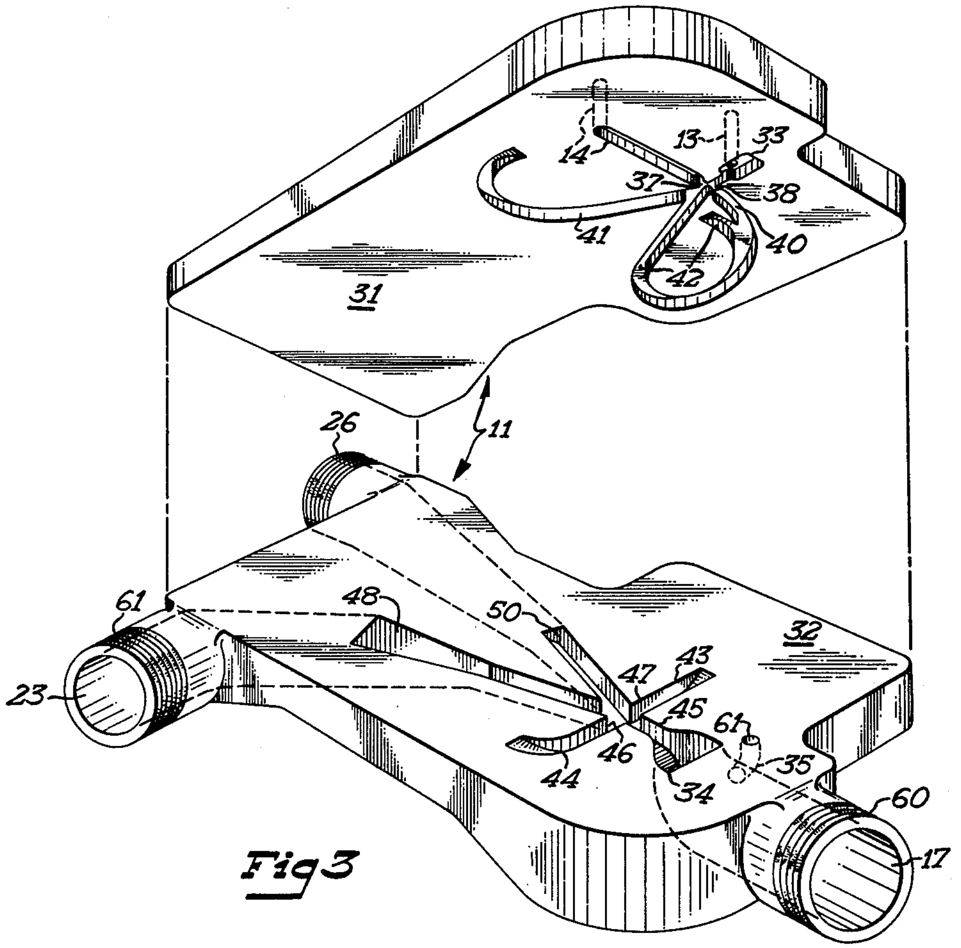
FIGURE 3 is an exploded isometric drawing disclosing a commercially formed fluid amplifier wherein the two fluid amplifier stages are individually formed in two parts that are sealed in a fluid tight manner.

The lower portion of FIGURE 3, that is the fluid amplifier means 32, has a control port 46 that is supplied from channel 44 which is sloped to meet channel 41. The port 47 connects to channel 43 which is sloped to mate with the sloped portion of channel 42. The fluid amplifier inlet 17, as shown in FIGURE 3, is a threaded pipe having threads 60 which can be conveniently connected into a plumbling system. The inlet 17 directly supplies fluid to the inlet 34 that supplies fluid to the inlet means 45 for the fluid amplifier means 32. A hole 61 is connected by the passage 35 that supplies common fluid flow to the inlet 33 of the first amplifier means 31 from the inlet 17. It is thus apparent that fluid flow into the inlet 17 flows through the common pipe 35 to both amplifier inlet sections thereby supplying inlet power for the units.

Figure 4:
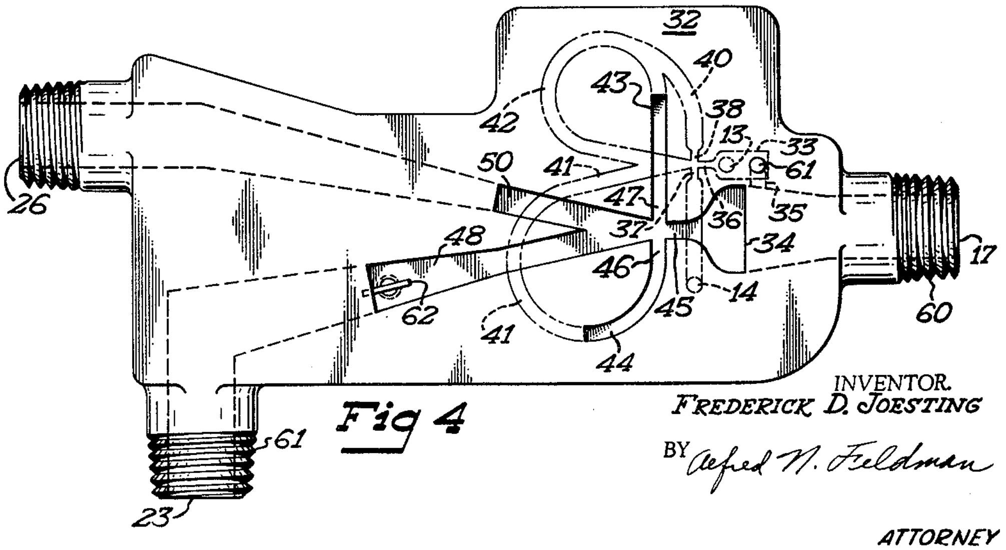
FIGURE 4 is a plan view of the lower body portion disclosed in FIGURE 3 with a phantom outline of the amplifier section contained in the upper section of FIGURE 3.

The fluid amplifier means 32 further has the outlet passage 50 which passes down into the body of the fluid amplifier means 32 and comes out at a threaded outlet 26. The other outlet channel 48 passes down into the body section once again and comes out at the outlet 23, which is threaded at 61 for convenience in hooking into a conventional plumbed system. It will be apparent that the parts of the fluid amplifier as disclosed in FIGURE 3 correspond very closely to the schematic arrangement disclosed in FIGURE 2. It will be noted that FIGURE 3 discloses all of the fluid amplifier sections being included in two main pieces or castings which can be sealed together by any convenient fashion. In the production versions of the present device, the attachment of the two units is accomplished by screws passing into threaded sections in the various parts of the bodies of the fluid amplifier means 31 and 32. A gasket (not shown) would be used to guarantee a fluid tight seal. This arrangement of screws and gasket has not been shown in the present drawings due to the desire to keep the invention clear of miscellaneous details that are not significant to the present invention. The most important item brought out by FIGURE 3 is that the two amplifier sections can be made up in two pieces and sealed to form a unitary fluid amplifier device 11. In FIGURE 4, a top view of the fluid amplifier means 32 is shown and the numbering of the various areas corresponds to that in FIGURE 3. In addition to the top view of the fluid amplifier means 32, a phantom schematic arrangement of the parts of the fluid amplifier section 31 are shown to show the relationship of the various parts of the amplifiers and the interconnection of passages. It is believed that a detailed explanation of FIGURE 4 is not warranted. The applicant does wish to bring out however that FIGURE 4 includes at 62 a vane that can be rotated in the outlet channel 48. The vane 62 is provided for factory adjustment of the unit so that the fluid flow restriction of the passages 48 and 50 is such that no reverse flow occurs in a radiator 24 that is connected between the outlets 23 and 26. The operation of this particular vane is not material to the present invention and has merely been shown as a means of bringing correspondence between the actual production version and the present drawings.

As can be seen from the present drawings when taken in light of the present specification, a fluid amplifier system has been disclosed that provides for a unique type of construction in two pieces for two separate amplifiers and further provides for a fluid amplifier system that is capable of switching fluid between two outlet ports merely by opening or closing a single control or pilot control means. The simplicity of the present arrangement allows for economical manufacture with adequate amplification and control to handle fluid flows in heating control systems. While the present invention has been specifically disclosed as a water control system for heating or cooling, the applicant wishes to point out that the fluid involved in the present unit can be any type of fluid. This would include gases, liquids, any mixture of gases or liquids, or any other type of material which can be readily caused to flow under the application of a differential pressure. The disclosure contained in the present application is illustrative of one preferred embodiment that has been constructed and tested and which would lead one to clearly understand the present invention. The applicant believes that the present disclosure would lead one skilled in the art to many variations and the applicant does not wish to be limited to the specific details contained in this application. The applicant wishes to be limited only in scope by the scope of the appended claims.

The embodiments of the invention in which an exclusive property or privilege is claimed are defined as follows.

I claim:

1. In a fluid amplifier system, including: two body portions joined at an interface in a fluid tight manner to provide a fluid control device; said body portions including first and second fluid amplifier means internally connected at said interface; said device further having common fluid supply means including a fluid flow; said first fluid amplifier means incorporated in a first said body portion including inlet means connected to said common fluid supply means and control ports on opposite sides of said inlet means; said first fluid amplifier means further including two outlet means each capable of handling the flow within said first amplifier means; feedback channel means connected between one said outlet means and the control port which diverts fluid from said connected outlet means; pilot control means external to said device connected to said control port opposite said feedback controlled port; said second fluid amplifier means incorporated in a second said body portion including inlet means connected to said common fluid supply means and control ports on opposite sides of said second amplifier inlet means; said second fluid amplifier means further having two outlet means each capable of handling the flow within said second amplifier means; and each outlet means of said first amplifier means connected to a separate one of said control ports of said second amplifier means; fluid flow in said feedback channel means causing the flow in said system to exit from one of said second outlet means when said pilot means is inactive; said pilot means causing said fluid flow to switch to said other outlet means of said second amplifier means when the pilot means is active.

2. In a temperature responsive fluid amplifier system, including: two substantially unitary body portions joined at an interface in a fluid tight manner to provide a fluid control device; said body portions including first and second fluid amplifier means internally connected at said interface and each having common fluid supply means within said device including a fluid flow; said first fluid amplifier means incorporated substantially wholly in a first said body portion including inlet means connected to said supply means and control ports on opposite sides of said inlet means; first fluid amplifier means further including two outlet means each capable of handling the flow within said first amplifier means; feedback channel means connected between one said outlet means and the control port which diverts fluid from said connected outlet means; external thermostatic control means connected to said control port opposite said feedback controlled port and to said fluid supply means; said second fluid amplifier means incorporated substantially wholly in a second said body portion including inlet means connected to said supply means and control ports on opposite sides of said second amplifier inlet means; said second fluid amplifier means further having two outlet means each capable of handling the flow within said second amplifier means; and each outlet means of said first amplifier means connected within said device to a separate one of said control ports of said second amplifier means; fluid flow in said feedback channel means causing the flow in said system to exit from one of said second outlet means when said thermostatic means is inactive; said thermostatic means causing said fluid flow to switch to said other outlet means of said second amplifier means when the thermostatic means is active to admit fluid flow from said common supply means.

References Cited by the Examiner

UNITED STATES PATENTS

| | | | |
|---|---|---|---|
| 3,001,539 | 9/61 | Hurvitz | 137—83 |
| 3,024,805 | 3/62 | Horton | 137—597 |
| 3,030,979 | 4/62 | Reilly | 137—624.14 |
| 3,075,548 | 1/63 | Horton | 137—83 |
| 3,122,165 | 2/64 | Horton | 137—81.5 |

FOREIGN PATENTS

| | | |
|---|---|---|
| 1,278,781 | 11/61 | France. |
| 1,278,782 | 11/61 | France. |

OTHER REFERENCES

Pursglove: Science and Mechanics, page 84, June 1960.

LAVERNE D. GEIGER, *Primary Examiner.*

M. CARY NELSON, *Examiner.*